(12) United States Patent
Lo et al.

(10) Patent No.: US 8,120,592 B2
(45) Date of Patent: Feb. 21, 2012

(54) TOUCH SENSING SUBSTRATE AND TOUCH SENSING LIQUID CRYSTAL DISPLAY

(75) Inventors: Cheng Lo, Taipei (TW); Ching-Sheng Cheng, Kaohsiung County (TW); Yung-Lun Lin, Yilan County (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 490 days.

(21) Appl. No.: 12/465,635

(22) Filed: May 13, 2009

(65) Prior Publication Data
US 2010/0128000 A1    May 27, 2010

(30) Foreign Application Priority Data
Nov. 25, 2008 (TW) ............................. 97145558 A

(51) Int. Cl.
*G06F 3/045* (2006.01)
*G06F 3/041* (2006.01)

(52) U.S. Cl. .................... 345/174; 345/104; 178/18.01; 178/18.06; 463/37

(58) Field of Classification Search .................. 345/104, 345/156–178; 178/18.01–18.06; 463/37
See application file for complete search history.

(56) References Cited

U.S. PATENT DOCUMENTS

| 6,057,903 | A | 5/2000 | Colgan et al. | |
|---|---|---|---|---|
| 2004/0239650 | A1* | 12/2004 | Mackey | 345/174 |
| 2008/0309633 | A1* | 12/2008 | Hotelling et al. | 345/173 |
| 2009/0046077 | A1* | 2/2009 | Tanaka et al. | 345/174 |
| 2009/0184937 | A1* | 7/2009 | Grivna | 345/174 |
| 2010/0079384 | A1* | 4/2010 | Grivna | 345/173 |

FOREIGN PATENT DOCUMENTS

WO       2007102238       9/2007

* cited by examiner

*Primary Examiner* — Lun-Yi Lao
*Assistant Examiner* — MD Saiful A Siddiqui
(74) *Attorney, Agent, or Firm* — Jianq Chyun IP Office

(57) ABSTRACT

A touch sensing substrate includes a substrate, first and second sensing series, a first dielectric layer, first and second dummy sensing series, a second dielectric layer, and a common electrode. The first sensing series are electrically insulated from each other, and so are the second sensing series. The first and the second sensing series are covered by the first dielectric layer. The first and the second dummy sensing series are disposed on the first dielectric layer. The first and the second dummy sensing series are disposed above the first and the second sensing series, respectively, and the dummy sensing series and the sensing series corresponding thereto have the same potential. The first and the second dummy sensing series are covered by the second dielectric layer. The common electrode is disposed on the second dielectric layer. A touch sensing liquid crystal display having the above-mentioned touch sensing substrate is also provided.

22 Claims, 7 Drawing Sheets

TOUCH SENSING SUBSTRATE AND TOUCH SENSING LIQUID CRYSTAL DISPLAY

CROSS-REFERENCE TO RELATED APPLICATION

This application claims the priority benefit of Taiwan application serial no. 97145558, filed on Nov. 25, 2008. The entirety of the above-mentioned patent application is hereby incorporated by reference herein and made a part of specification.

BACKGROUND OF THE INVENTION

1. Field of the Invention

The present invention relates to a touch sensing substrate and a touch sensing liquid crystal display (LCD). More particularly, the present invention relates to a low noise touch sensing substrate and a low noise touch sensing LCD.

2. Description of Related Art

Based on different sensing types, a touch sensing panel can be generally categorized into a resistive touch sensing panel, a capacitive touch sensing panel, an optical touch sensing panel, an acoustic-wave touch sensing panel, and an electro-magnetic touch sensing panel. The capacitive touch sensing panel is characterized by short response speed, favorable reliability, satisfactory durability, and so on. Therefore, the capacitive touch sensing panel is just slightly less popular than the resistive touch sensing panel. According to structural and manufacturing differences, the capacitive touch sensing panel can be further classified into an added type touch sensing panel and an integrated/in-cell touch sensing panel. In the added type capacitive touch sensing panel, sensing series are first formed on a substrate, and the substrate having the sensing series is then adhered to an outer surface of a display. Apparently, the substrate of the added type touch sensing panel brings about an increase in entire thickness of the added type touch sensing panel, which is unfavorable to miniaturization and microminiaturization of the display.

FIG. 1A is a schematic view of a conventional touch sensing substrate. Referring to FIG. 1A, the conventional touch sensing substrate 100a includes a substrate 110, a plurality of X sensing series 120, a plurality of Y sensing series 130, a first dielectric layer 140, a second dielectric layer 150, and a common electrode 160. Each of the X sensing series 120 is electrically insulated from each other, and so is each of the Y sensing series 130. The first dielectric layer 140 covers the X sensing series 120 and the Y sensing series 130, and the first dielectric layer 140 is disposed at one side of the substrate 110. The second dielectric layer 150 and the first dielectric layer 140 are respectively located at opposite sides of the substrate 110. Besides, the second dielectric layer 150 and the first dielectric layer 140 include a plurality of color filter patterns 152, respectively. In addition, the common electrode 160 is disposed on the second dielectric layer 150.

As indicated in FIG. 1A, a parasitical capacitance $C_P$ of the conventional touch sensing substrate 100a includes a parasitical capacitance $C_{X-Y}$ generated between the X sensing series 120 and the Y sensing series 130 and a parasitical capacitance $C_{X-COM}$ generated between the X sensing series 120 and the common electrode 160. In other words, $C_P = C_{X-Y} + C_{X-COM}$. Nonetheless, due to the thickness of the substrate 110, the value of the parasitical capacitance $C_{X-COM}$ appears to be rather small and can be neglected in comparison with the parasitical capacitance $C_{X-Y}$. Therefore, $CP_{(100a)} \approx C_{X-Y}$.

FIG. 1B is a schematic view of a conventional integrated touch sensing substrate. Referring to FIG. 1B, the conventional integrated touch sensing substrate 100b includes a substrate 110, a plurality of X sensing series 120, a plurality of Y sensing series 130, a first dielectric layer 140, a second dielectric layer 150, and a common electrode 160. The touch sensing substrate 100b has a similar structure to that of the touch sensing substrate 100a, while the main difference therebetween lies in that the X sensing series 120, the Y sensing series 130, the first dielectric layer 140, the second dielectric layer 150, and the common electrode 160 of the touch sensing substrate 100b are all disposed at the same side of the substrate 110. Additionally, a distance between the common electrode 160 and the X sensing series 120 and a distance between the common electrode 160 and the Y sensing series 130 are relatively short in the touch sensing substrate 100b in comparison with the touch sensing substrate 100a.

It can be observed from FIG. 1B the parasitical capacitance generated by the conventional touch sensing substrate 100b is the same as the parasitical capacitance generated by the touch sensing substrate 100a, i.e., $CP_{(100b)} = C_{X-Y} + C_{X-COM}$. However, the distance between the X sensing series 120 and the common electrode 160 of the touch sensing substrate 100b is merely several micrometers (μm), and accordingly the parasitical capacitance generated therebetween cannot be disregarded.

FIG. 1C is an equivalent circuit diagram of a conventional touch sensing substrate after the touch sensing substrate is touched. Referring to FIG. 1C, a capacitance $C_{X-f}$ is generated between the X sensing series and fingers after said two conventional touch sensing substrates 100a and 100b are touched by the fingers. That is to say, the capacitance $C_{X-f}$ between the X sensing series and the fingers is the so-called touch sensing signal, while the other capacitances are regarded as noises. Hence, a signal to noise (S/N) ratio is $C_{X-f}/C_P$. Namely, the S/N ratio = $C_{X-f}/C_{X-Y} + C_{X-COM}$. Specifically, the touch sensing substrate 100a has an S/N ratio $S/N_{(100a)} = C_{X-f}/C_{X-Y}$, while the touch sensing substrate 100b has an S/N ratio $S/N_{(100b)} = C_{X-f}/C_{X-Y} + C_{X-COM}$.

Based on the above, even though the touch sensing substrate 100b can be miniaturized and has a simple and easy manufacturing process, the S/N ratio of the touch sensing substrate 100b is much higher than that of the touch sensing substrate 100a, which is likely to result in erroneous actions. As such, the design of the integrated capacitive touch sensing panel still requires further improvement.

SUMMARY OF THE INVENTION

The present invention is directed to a touch sensing substrate capable of reducing cross-talk effect between a common electrode and sensing series.

The present invention is further directed to a touch sensing LCD having dummy sensing series for reducing erroneous actions.

In the present invention, a touch sensing substrate including a substrate, a plurality of first sensing series, a plurality of second sensing series, a first dielectric layer, a plurality of first dummy sensing series, a plurality of second dummy sensing series, a second dielectric layer, and a common electrode is provided. The first sensing series are electrically insulated from each other, and so are the second sensing series. The first dielectric layer covers the first sensing series and the second sensing series. The first dummy sensing series are disposed on the first dielectric layer and located above the first sensing series. Besides, the first dummy sensing series are electrically insulated from each other, and each of the first dummy sensing series and corresponding one of the first sensing series have the same potential. The second dummy sensing series are disposed above the second sensing series. Besides, the second dummy sensing series are electrically insulated from each other, and each of the second dummy sensing series and corresponding one of the second sensing series have the same potential. In addition, the second dielectric layer covers the first dummy sensing series and the second dummy sensing series. The common electrode is disposed on the second dielectric layer.

According to an embodiment of the present invention, the first sensing series extend along a first direction, the second sensing series extend along a second direction, and the first direction is different from the second direction.

According to an embodiment of the present invention, each of the first sensing series or each of the second sensing series includes a plurality of sensing pads and a plurality of bridge lines. Each of the bridge lines connects two adjacent sensing pads.

According to an embodiment of the present invention, a material of the sensing pads includes a transparent conductive material.

According to an embodiment of the present invention, a material of the bridge lines and a material of the sensing pads are the same, i.e., a transparent conductive material.

According to an embodiment of the present invention, a material of the bridge lines and a material of the sensing pads are different. The bridge lines can be made of a metallic conductive material.

According to an embodiment of the present invention, resistance of the bridge lines is lower than resistance of the sensing pads.

According to an embodiment of the present invention, the material of the bridge lines includes metal.

According to an embodiment of the present invention, the second dielectric layer includes a plurality of color filter patterns.

According to an embodiment of the present invention, the touch sensing substrate can further include a black matrix layer. The black matrix layer is disposed among a plurality of color filter patterns.

According to an embodiment of the present invention, the touch sensing substrate can further include a third dielectric layer disposed between a plurality of color filter patterns and the common electrode.

In the present invention, a touch sensing LCD including a first substrate, a second substrate, and a liquid crystal layer is further provided. The first substrate includes a plurality of first sensing series, a plurality of second sensing series, a first dielectric layer, a plurality of first dummy sensing series, a plurality of second dummy sensing series, a second dielectric layer, and a common electrode. The first sensing series are electrically insulated from each other, and so are the second sensing series. Besides, the first dielectric layer covers the first sensing series and the second sensing series. The first dummy sensing series are disposed on the first dielectric layer and located above the first sensing series. Here, the first dummy sensing series are electrically insulated from each other, and each of the first dummy sensing series and corresponding one of the first sensing series have the same potential. The second dummy sensing series are disposed above the second sensing series. Here, the second dummy sensing series are electrically insulated from each other, and each of the second dummy sensing series and corresponding one of the second sensing series have the same potential. The second dielectric layer covers the first dummy sensing series and the second dummy sensing series. The common electrode is disposed on the second dielectric layer. The second substrate is disposed opposite to the common electrode of the first substrate. Besides, the second substrate at least has a plurality of pixel electrodes arranged in array. The liquid crystal layer is disposed between the first substrate and the second substrate.

According to an embodiment of the present invention, the first sensing series extend along a first direction, the second sensing series extend along a second direction, and the first direction is different from the second direction.

According to an embodiment of the present invention, each of the first sensing series or each of the second sensing series includes a plurality of sensing pads and a plurality of bridge lines. Each of the bridge lines connects two adjacent sensing pads.

According to an embodiment of the present invention, a material of the sensing pads includes a transparent conductive material.

According to an embodiment of the present invention, a material of the bridge lines and a material of the sensing pads are the same.

According to an embodiment of the present invention, a material of the bridge lines and a material of the sensing pads are different.

According to an embodiment of the present invention, resistance of the bridge lines is lower than resistance of the sensing pads.

According to an embodiment of the present invention, the material of the bridge lines includes metal.

According to an embodiment of the present invention, the second dielectric layer includes a plurality of color filter patterns.

According to an embodiment of the present invention, the touch sensing LCD can further include a black matrix layer disposed among a plurality of color filter patterns.

According to an embodiment of the present invention, the touch sensing LCD can further include a third dielectric layer. The third dielectric layer is disposed between a plurality of color filter patterns and the common electrode.

Since the dummy sensing series of the present invention reduce the cross-talk effect between the common electrode and the sensing series, sensitivity of the touch sensing substrate is not apt to decrease notwithstanding interferences of the parasitical capacitance.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
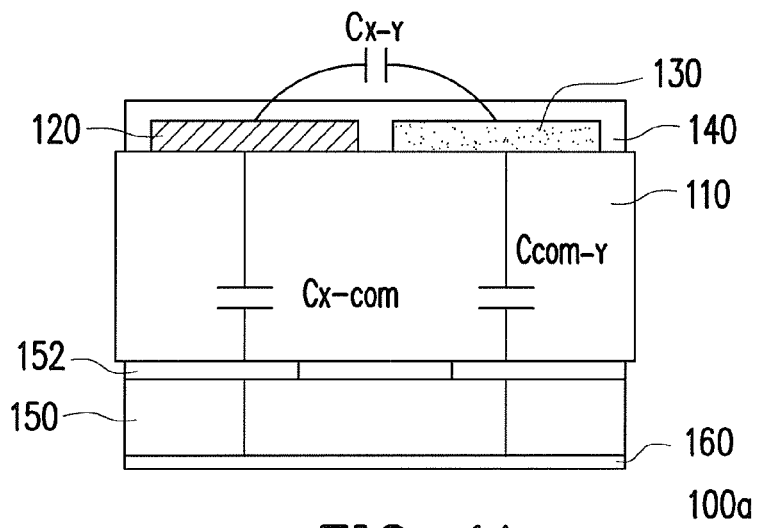
FIG. 1A is a schematic view of a conventional touch sensing substrate.
Figure 1B:
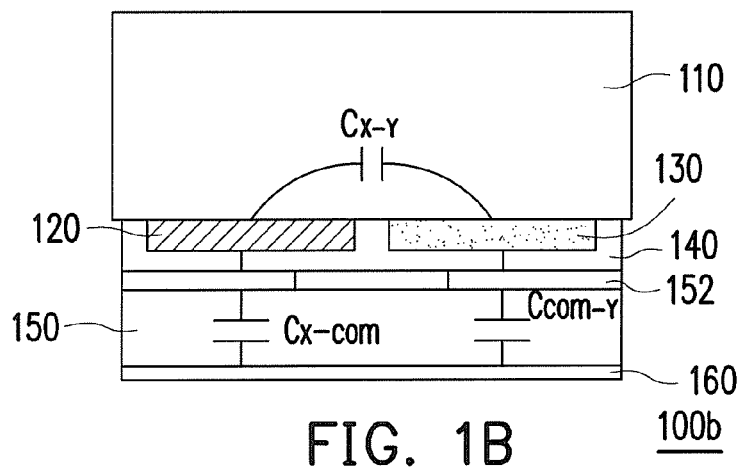
FIG. 1B is a schematic view of a conventional integrated touch sensing substrate.
Figure 1C:
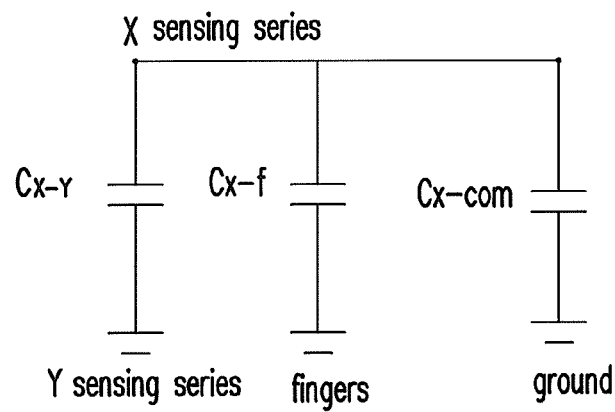
FIG. 1C is an equivalent circuit diagram of a conventional touch sensing substrate after the touch sensing substrate is touched.
Figure 2A:
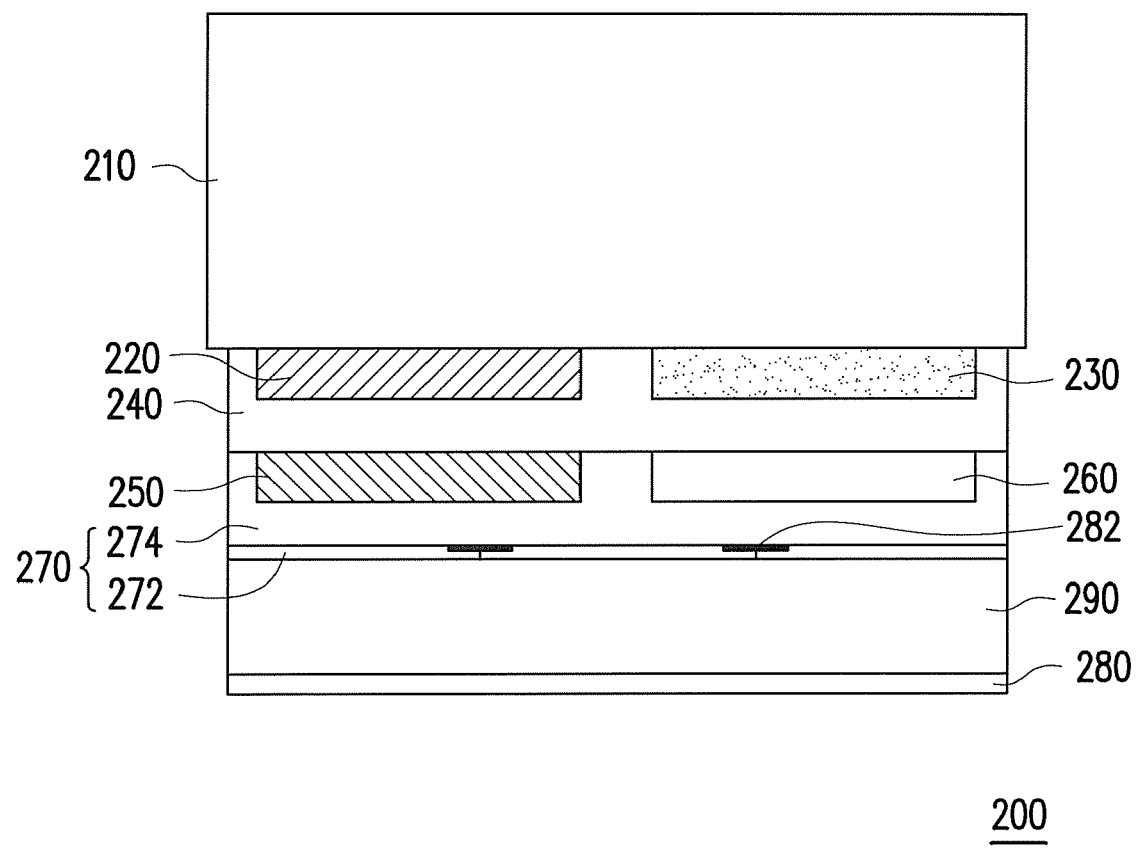
FIG. 2A is a schematic view of a touch sensing substrate according to an embodiment of the present invention.

FIG. 2A is a schematic view of a touch sensing substrate according to an embodiment of the present invention. Referring to FIG. 2A, a touch sensing substrate 200 of the present embodiment includes a substrate 210, a plurality of first sensing series 220, a plurality of second sensing series 230, a first dielectric layer 240, a plurality of first dummy sensing series 250, a plurality of second dummy sensing series 260, a second dielectric layer 270, and a common electrode 280. The first sensing series 220 (e.g. X sensing series) are electrically insulated from each other, and so are the second sensing series 230 (e.g. Y sensing series). The first dielectric layer 240 covers the first sensing series 220 and the second sensing series 230. The first dummy sensing series 250 are disposed on the first dielectric layer 240 and located above the first sensing series 220. Note that the first dummy sensing series 250 are electrically insulated from each other, and each of the first dummy sensing series 250 and one of the first sensing series 220 corresponding thereto have the same potential. In other words, the first dummy sensing series 250 and the corresponding first sensing series 220 can be collectively connected to a first external circuit through traces, and therefore the driving potential of the first dummy sensing series 250 is the same as the driving potential of the corresponding first sensing series 220. The second dummy sensing series 260 are disposed above the second sensing series 230. Here, the second dummy sensing series 260 are electrically insulated from each other, and each of the second dummy sensing series 260 and one of the second sensing series 230 corresponding thereto have the same potential. Namely, the second dummy sensing series 260 and the corresponding second sensing series 230 can be collectively connected to a second external circuit through traces, and therefore the driving potential of the second dummy sensing series 260 is the same as the driving potential of the corresponding second sensing series 230. In addition, the second dielectric layer 270 covers the first dummy sensing series 250 and the second dummy sensing series 260, and the common electrode 280 is disposed on the second dielectric layer 270.

It can be observed from FIG. 2A that the second dielectric layer 270 can further include a plurality of color filter patterns 272. In detail, the second dielectric layer 270 can further include other dielectric material layers 274. According to the present embodiment, the touch sensing substrate 200 can further include a black matrix layer 282 disposed among a plurality of color filter patterns 272. The touch sensing substrate 200 of the present embodiment can further include a third dielectric layer 290 disposed between the color filter patterns 272 and the common electrode 280.

Figure 2B:
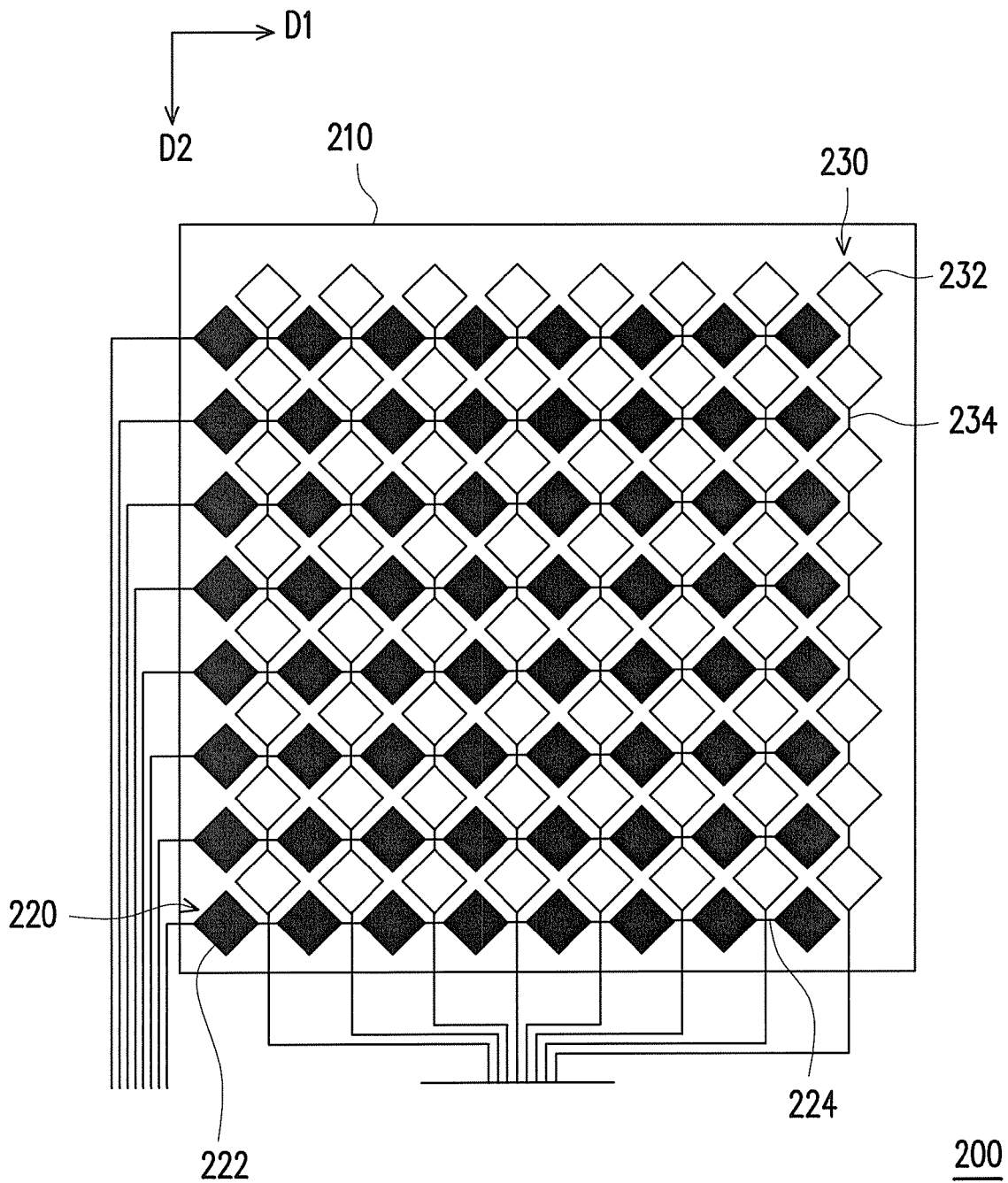
FIG. 2B is a top view of a touch sensing substrate according to an embodiment of the present invention.

FIG. 2B is a top view of a touch sensing substrate according to an embodiment of the present invention. Referring to FIG. 2B, in the touch sensing substrate 200 of the present embodiment, the first sensing series 220 extend along a first direction $D_1$. The first dummy sensing series 250 are overlapped with the corresponding first sensing series 220 and thus are not shown. The second sensing series 230 extend along a second direction $D_2$. The second dummy sensing series 260 are overlapped with the corresponding second sensing series 220 and thus are not shown. The first direction $D_1$ is different from the second direction $D_2$. Besides, the first sensing series 220 include a plurality of sensing pads 222 and a plurality of bridge lines 224, and the second sensing series 230 include a plurality of sensing pads 232 and a plurality of bridge lines 234. Each of the bridge lines 224 (234) connects two adjacent sensing pads 222 (232). When the sensing pads 222 and 232 are in the same plane, the bridge lines 224 and 234 are electrically insulated from each other through a dielectric layer (not shown). In the present embodiment, the sensing pads 222 (232) are, for example, made of a transparent conductive material, and the bridge lines 224 (234) are, for example, made of metal. Alternatively, the bridge lines 224 (234) and the sensing pads 222 (232) can be made of either the same material (e.g. the transparent conductive material) or different materials. For instance, the bridge lines 224 (234) are made of a metallic conductive material, and the sensing pads 222 (232) are made of the transparent conductive material. Moreover, resistance of the bridge lines 224 (234) is often lower than resistance of the sensing pads 222 (232).

Figure 3:
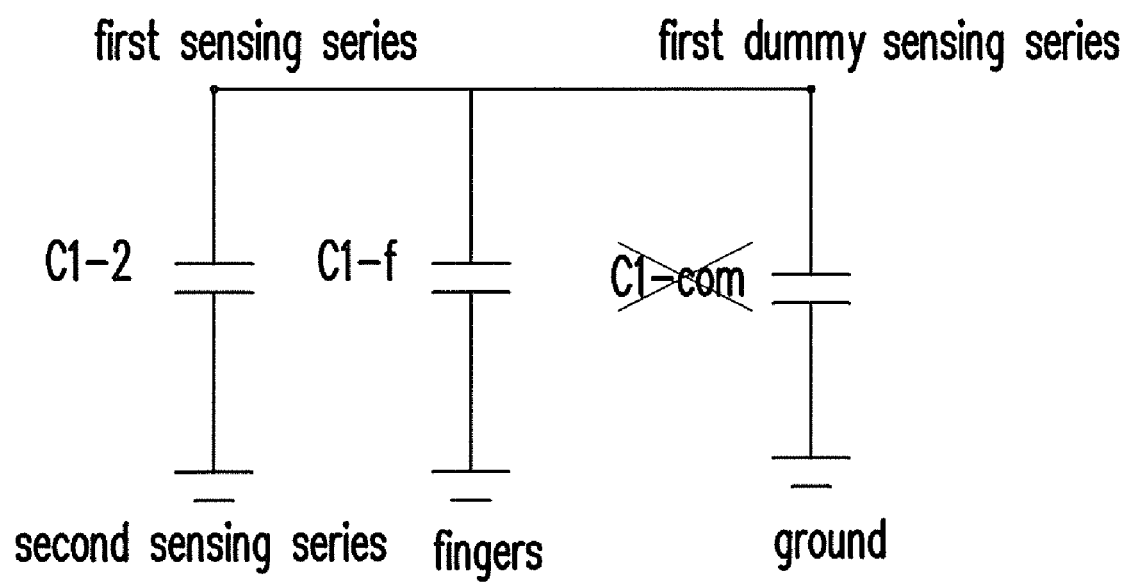
FIG. 3 is an equivalent circuit diagram of a touch sensing substrate according to an embodiment of the present invention after the touch sensing substrate is touched.

FIG. 3 is an equivalent circuit diagram of a touch sensing substrate according to an embodiment of the present invention after the touch sensing substrate is touched. Referring to FIGS. 2A and 3, after the touch sensing substrate 200 of the present embodiment is touched by fingers, a capacitance $C_{1-f}$ is generated between the fingers and the first sensing series 220 (e.g. the X sensing series). The first dummy sensing series 250 are disposed above the first sensing series 220 and sandwiched between the first sensing series 220 and the common electrode 280. Additionally, the first dummy sensing series 250 and the first sensing series 220 corresponding thereto have the same potential. Therefore, the first dummy sensing series 250 shield the common electrode 280 and the first sensing series 220 for reducing the cross-talk effect occurring therebetween. That is to say, a parasitical capacitance $C_{1-COM}$ between the first sensing series 220 and the common electrode 280 does not occur because of the shield provided by the first dummy sensing series 250. Accordingly, the touch sensing substrate 200 of the present embodiment has a S/N ratio $S/N_{(200)} = C_{1-f}/C_{1-2}$. In comparison with the S/N ratio $S/N_{(100b)}$ of the conventional touch sensing substrate 100b, the S/N ratio $S/N_{(200)}$ of the touch sensing substrate 200 in the present embodiment is increased significantly because the noise of the touch sensing substrate 200 is greatly reduced. Thereby, sensitivity can be improved.

Figure 4A:
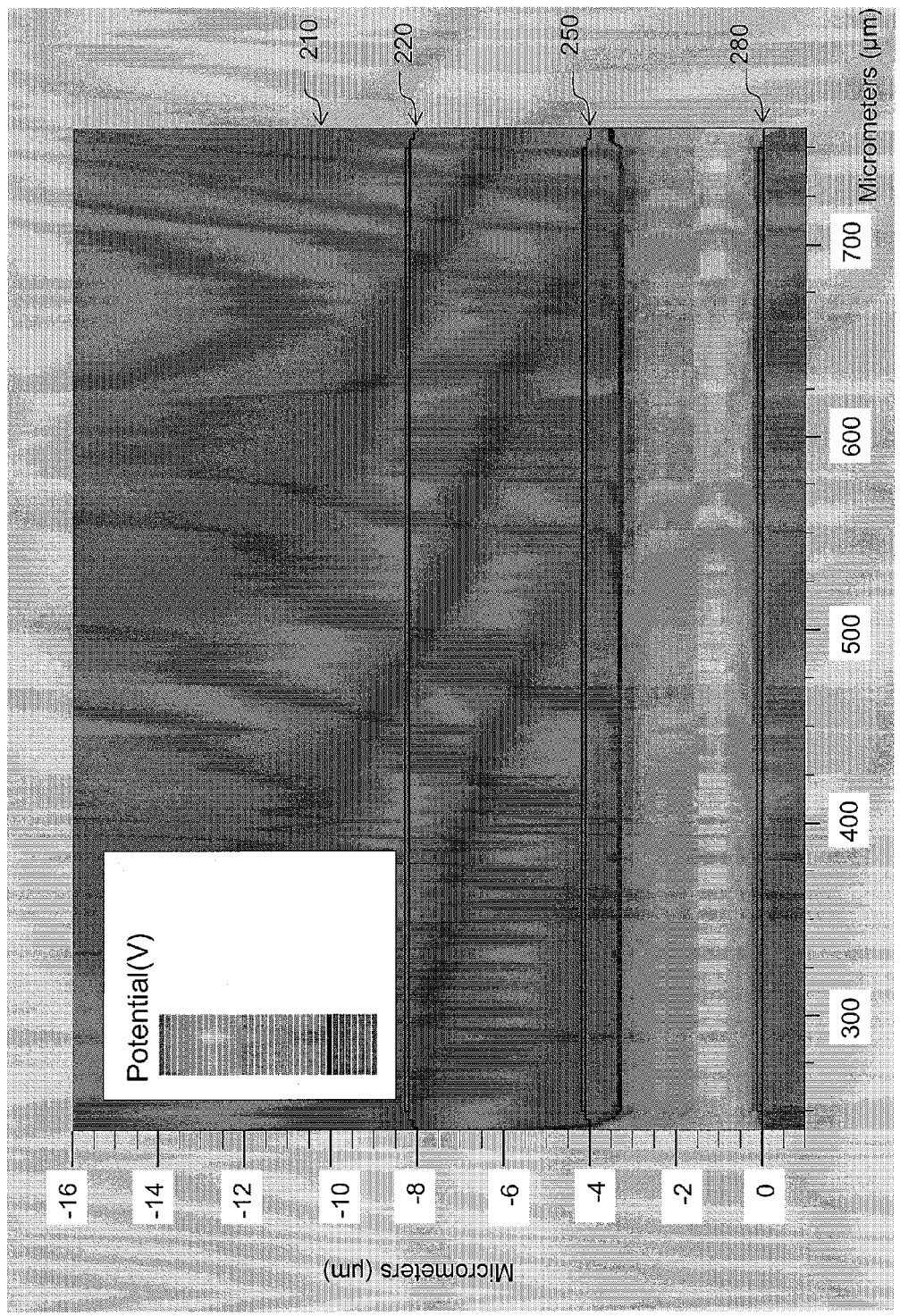
FIGS. 4A and 4B are comparison diagrams illustrating electrical field gradient distribution between a touch sensing substrate according to an embodiment of the present invention and the conventional touch sensing substrate, respectively.
Figure 4B:
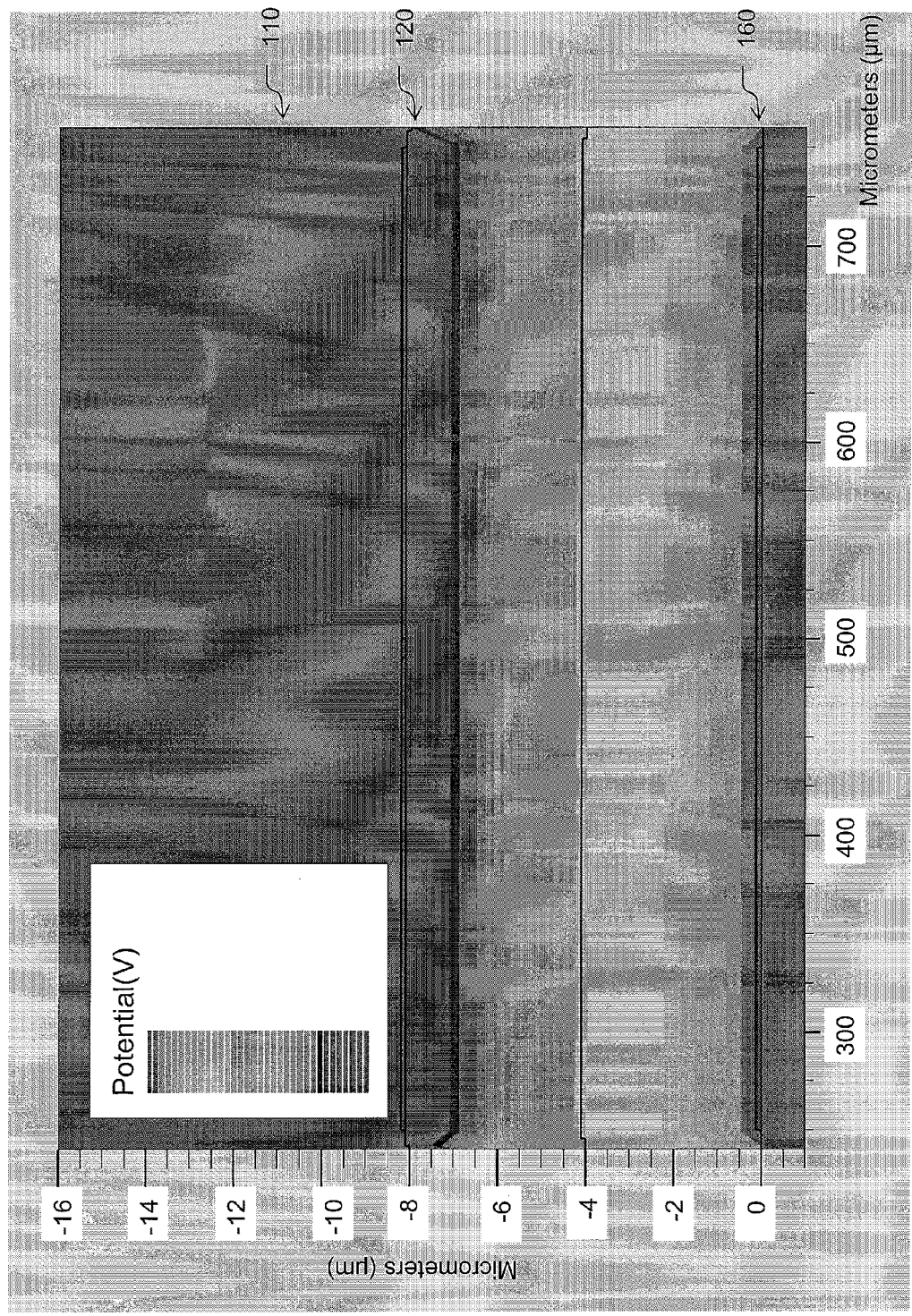

FIGS. 4A and 4B are comparison diagrams illustrating electrical field gradient distribution between a touch sensing substrate according to an embodiment of the present invention and the conventional touch sensing substrate, respectively. Referring to FIGS. 4A and 4B illustrating comparison results of the electrical field gradient distribution in the two touch sensing substrates, it is shown that the electrical field gradient between the dummy sensing series 250 and the sensing series 220 is nearly zero. Hence, the dummy sensing series 250 of the present invention can effectively shield the common electrode 280 and the sensing series 220 for reducing cross-talk effect occurring therebetween. By contrast, as shown in FIG. 4B, no shield is provided to the common electrode 160 and the sensing series 120 in the conventional touch sensing substrate, and accordingly the electrical field of the common electrode 160 interferes with the sensing series 120 and results in noise. Relatively, the sensitivity is reduced thereby.

Figure 5:
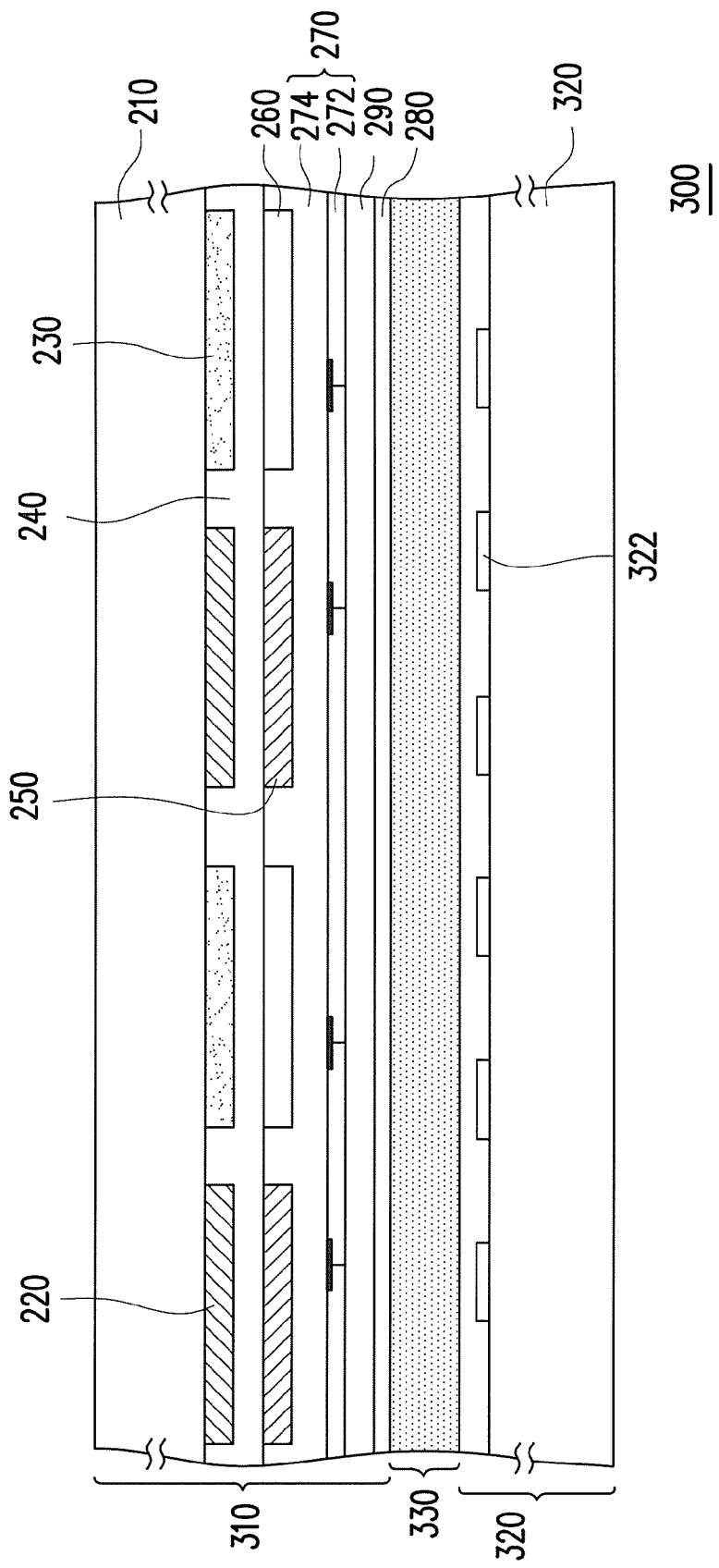
FIG. 5 is a schematic view of a touch sensing LCD according to another embodiment of the present invention.

FIG. 5 is a schematic view of a touch sensing LCD according to another embodiment of the present invention. Referring to FIG. 5, the touch sensing LCD 300 of the present embodiment includes a first substrate 310, a second substrate 320, and a liquid crystal layer 330. The first substrate 310 has the structure of the aforesaid touch sensing substrate 200. Besides, the second substrate 320 is disposed opposite to the common electrode 280 of the first substrate 310 and at least has a plurality of pixel electrodes 322 arranged in array. Moreover, the liquid crystal layer 330 is disposed between the first substrate 310 and the second substrate 320. According to the above descriptions, the touch sensing structure can be integrated into a display, which not only supplies the display luminance but also reduces panel weight and manufacturing costs. The touch sensing substrate 200 can also be integrated into display apparatuses including organic light emitting displays and electronic paper in addition to the above touch sensing LCD 300.

In view of the foregoing, the touch sensing substrate and the touch sensing LCD of the present invention are conducive to reduction of erroneous actions by way of disposition of the dummy sensing series. Further, the sensitivity of the touch sensing substrate and the touch sensing LCD can also be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch sensing substrate, comprising:
   a substrate;
   a plurality of first sensing series electrically insulated from each other;
   a plurality of second sensing series electrically insulated from each other;
   a first dielectric layer covering the plurality of first sensing series and the plurality of second sensing series;
   a plurality of first dummy sensing series disposed on the first dielectric layer and located above the plurality of first sensing series, wherein the plurality of first dummy sensing series are electrically insulated from each other, and each of the plurality of first dummy sensing series and corresponding one of the plurality of first sensing series have the same potential;
   a plurality of second dummy sensing series disposed above the plurality of second sensing series, wherein the plurality of second dummy sensing series are electrically insulated from each other, and each of the plurality of second dummy sensing series and corresponding one of the plurality of second sensing series have the same potential;
   a second dielectric layer covering the plurality of first dummy sensing series and the plurality of second dummy sensing series; and
   a common electrode disposed on the second dielectric layer.

2. The touch sensing substrate as claimed in claim 1, wherein the plurality of first sensing series extend along a first direction, the plurality of second sensing series extend along a second direction, and the first direction is different from the second direction.

3. The touch sensing substrate as claimed in claim 1, wherein each of the plurality of first sensing series or each of the plurality of second sensing series comprises:
   a plurality of sensing pads; and
   a plurality of bridge lines, each of the plurality of bridge lines connecting two of the plurality of sensing pads adjacent thereto.

4. The touch sensing substrate as claimed in claim 3, wherein a material of the plurality of sensing pads comprises a transparent conductive material.

5. The touch sensing substrate as claimed in claim 3, wherein a material of the plurality of bridge lines and a material of the plurality of sensing pads are the same.

6. The touch sensing substrate as claimed in claim 3, wherein a material of the plurality of bridge lines and a material of the plurality of sensing pads are different.

7. The touch sensing substrate as claimed in claim 6, wherein resistance of the plurality of bridge lines is lower than resistance of the plurality of sensing pads.

8. The touch sensing substrate as claimed in claim 7, wherein a material of the plurality of bridge lines comprises metal.

9. The touch sensing substrate as claimed in claim 1, wherein the second dielectric layer comprises a plurality of color filter patterns.

10. The touch sensing substrate as claimed in claim 9, further comprising a black matrix layer disposed among a plurality of color filter patterns.

11. The touch sensing substrate as claimed in claim 9, further comprising a third dielectric layer disposed between a plurality of color filter patterns and the common electrode.

12. A touch sensing liquid crystal display, comprising:
    a first substrate, comprising:
       a plurality of first sensing series electrically insulated from each other;
       a plurality of second sensing series electrically insulated from each other;
       a first dielectric layer covering the plurality of first sensing series and the plurality of second sensing series;
       a plurality of first dummy sensing series disposed on the first dielectric layer and located above the plurality of first sensing series, wherein the plurality of first dummy sensing series are electrically insulated from each other, and each of the plurality of first dummy sensing series and corresponding one of the plurality of first sensing series have the same potential;
       a plurality of second dummy sensing series disposed above the plurality of second sensing series, wherein the plurality of second dummy sensing series are electrically insulated from each other, and each of the plurality of second dummy sensing series and corresponding one of the plurality of second sensing series have the same potential;
       a second dielectric layer covering the plurality of first dummy sensing series and the plurality of second dummy sensing series; and
       a common electrode disposed on the second dielectric layer; and
    a second substrate disposed opposite to the common electrode of the first substrate and at least having a plurality of pixel electrodes arranged in array; and
    a liquid crystal layer disposed between the first substrate and the second substrate.

13. The touch sensing liquid crystal display as claimed in claim 12, wherein the plurality of first sensing series extend along a first direction, the plurality of second sensing series extend along a second direction, and the first direction is different from the second direction.

14. The touch sensing liquid crystal display as claimed in claim 12, wherein each of the plurality of first sensing series or each of the plurality of second sensing series comprises:

a plurality of sensing pads; and a plurality of bridge lines, each of the plurality of bridge lines connecting two of the plurality of sensing pads adjacent thereto.

15. The touch sensing liquid crystal display as claimed in claim 14, wherein a material of the plurality of sensing pads comprises a transparent conductive material.

16. The touch sensing liquid crystal display as claimed in claim 14, wherein a material of the plurality of bridge lines and a material of the plurality of sensing pads are the same.

17. The touch sensing liquid crystal display as claimed in claim 14, wherein a material of the plurality of bridge lines and a material of the plurality of sensing pads are different.

18. The touch sensing liquid crystal display as claimed in claim 17, wherein resistance of the plurality of bridge lines is lower than resistance of the plurality of sensing pads.

19. The touch sensing liquid crystal display as claimed in claim 18, wherein a material of the plurality of bridge lines comprises metal.

20. The touch sensing liquid crystal display as claimed in claim 12, wherein the second dielectric layer comprises a plurality of color filter patterns.

21. The touch sensing liquid crystal display as claimed in claim 20, further comprising a black matrix layer disposed among a plurality of color filter patterns.

22. The touch sensing liquid crystal display as claimed in claim 20, further comprising a third dielectric layer disposed between a plurality of color filter patterns and the common electrode.

* * * * *